United States Patent
Hojjati

(10) Patent No.: US 12,315,230 B2
(45) Date of Patent: May 27, 2025

(54) WATERMARKING MACHINE LEARNING TRAINING DATA FOR VERIFICATION THEREOF

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 335 days.

(21) Appl. No.: 18/193,046

(22) Filed: Mar. 30, 2023

(65) Prior Publication Data

US 2024/0331357 A1 Oct. 3, 2024

(51) Int. Cl.
*G06V 10/774* (2022.01)
*G06T 1/00* (2006.01)

(52) U.S. Cl.
CPC .......... *G06V 10/774* (2022.01); *G06T 1/0021* (2013.01)

(58) Field of Classification Search
CPC ............................ G06V 10/774; G06T 1/0021
See application file for complete search history.

(56) References Cited

U.S. PATENT DOCUMENTS

2021/0127085 A1* 4/2021 Greaves ................. H04N 5/913

* cited by examiner

*Primary Examiner* — Christopher Wait
(74) *Attorney, Agent, or Firm* — Baratta Law PLLC; Lawrence A. Baratta, Jr.

(57) ABSTRACT

Systems and methods for watermarking machine learning training data for verification thereof, include, for a training data provider, obtaining training data; responsive to verifying the training data based on a use case or application associated therewith, watermarking the training data by adding watermarked data therein; and publishing the watermarked training data. For a machine learning model provider, the systems and methods include obtaining training data to train the machine learning model for an application or use case, to any of make predictions, inferences, and classifications related to the application or use case; obtaining a one-way function associated with the application or use case; checking the training data with the one-way function to determine validity thereof; and, responsive to the validity, utilizing the training data to train the machine learning model.

20 Claims, 4 Drawing Sheets

WATERMARKING MACHINE LEARNING TRAINING DATA FOR VERIFICATION THEREOF

FIELD OF THE DISCLOSURE

The present disclosure relates generally to computing and machine learning. More particularly, the present disclosure relates to systems and methods for watermarking machine learning training data for verification thereof.

BACKGROUND OF THE DISCLOSURE

Machine Learning (ML) techniques are proliferating and offer many use cases, in many different applications. For example, ML techniques can be used in image recognition, speech recognition, predictions, product or content recommendations, autonomous systems, network security, content filtering, malware detection, and the like. Supervised machine learning (and semi-supervised machine learning) seeks to create a machine learning model using training data, e.g., with labels. Unsupervised machine learning also can use training data, but without labels. There are generally two steps here—(1) creation/training of the machine learning model with training data, and (2) use of the trained machine learning model in production to tackle some problem such as to make some inferences, predictions, classifications, etc. As is known in the art, the quality of a machine learning model is only as good as the dataset it was trained on. Further, some applications are critical to ensure proper ML techniques, e.g., self-driving cars, malware detection, etc. There is a need to ensure any training data is legitimate, from trusted sources, is pertinent to the use case or application, is not poisoned or adversarial, etc.

BRIEF SUMMARY OF THE DISCLOSURE

The present disclosure relates to systems and methods for watermarking machine learning training data for verification thereof. As described herein, training data includes a set of data used to train a machine learning model (also referred to as a machine learning algorithm, process, etc.). Machine learning models create and refine their rules using this data. The training data is a set of data samples used to fit the parameters of a machine learning model to training it by example. Such data is used to train classifiers in order to achieve a certain outcome (identifying cats versus dogs, cars versus planes, benign versus malicious content, etc.). Of note, training data is usually a large amount of data and is widely available from numerous sources. A trained machine learning model is only as good as the training data. There can be an issue when using data from untrusted sources. For example, training a model to identify cars versus planes, but assume the training data is a large dataset of cats; consequently, this model will generate an output which is (1) not correct and (2) cannot be trusted.

In various embodiments, the present disclosure addresses these two issues in training data, namely (1) not correct and (2) cannot be trusted. The present disclosure includes an approach to watermark or sign a training data set. Initially, the training data will be signed if and only if an operator or a process determines the data is valid and from a trusted source. At the training stage, the training data can be checked and only used to train a machine learning model if and only if the training data is signed. Finally, the trained machine learning model can be signed to prove the training data was valid and the model checked the training data before the training stage, thereby showing legitimacy of the trained machine learning model.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
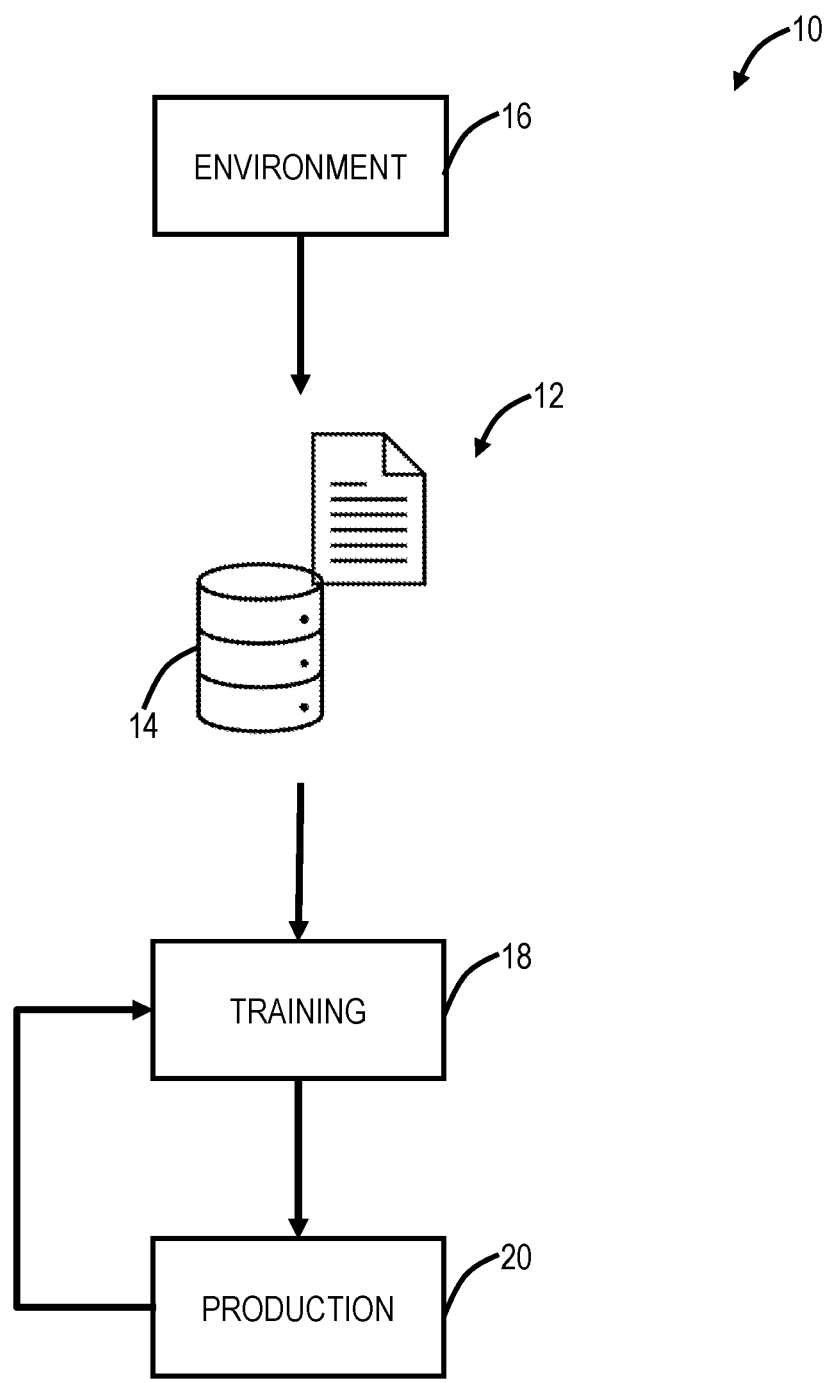
FIG. 1 is a diagram of a training process for a machine learning model.

Again, the present disclosure relates to systems and methods for watermarking machine learning training data for verification thereof.

Machine Learning

Machine learning (ML) can also referred to as Artificial Intelligence. ML techniques are exploding and will address every industry, every application, etc. The present disclosure relates to classes of machine learning techniques that rely on training data, such as supervised learning where the training data is labeled, unsupervised learning where the training data is not necessarily labeled, etc. Again, as described herein, the term "machine learning model" or "model" will be used and this is meant to encompass the terms machine learning algorithms, techniques, classifiers, processes, etc. Some models can be used for benign purposes, e.g., suggesting content in a streaming platform. Other models can be used in mission-critical applications, e.g., autonomous vehicles, malware detection. Of course, there is a desire to have the best model as possible in all applications. However, it is especially critical to have the best model as possible in mission-critical applications.

Those skilled in the art recognize there are generally two stages associated with machine learning models, namely:

(1) Training (2) Production

Basically, a model is trained and the predictive capabilities of the model are evaluated, and then the model is released to production where the model is used to make inferences, make classifications, predictions, etc. Again, as described herein, a model is only as good as the training data. The present disclosure focuses on the training and the legitimacy thereof. These two stages can be viewed as a formulation stage for the training where the machine learning model is created, trained, etc., and the use stage where the machine learning model is used in production, i.e., live in an environment to do the thing it was trained to do. Of course, there are more details omitted here for ease of illustration, such as evaluation stages where the model is checked after training, periodically during production, etc., as well as retraining where the model is updated, such as based om the evaluation stages, based on new training data, etc.

Machine Learning Model Training

The present disclosure addresses training data which can be used in various types of machine learning models. The following provides some discussion of example machine learning models and their approach to training with the training data. Those skilled in the art will appreciate these are presented for illustrative purposes, and the present disclosure contemplates any type of machine learning model that uses training data.

Supervised machine learning utilizes training data with labels, where the labels convey some output, e.g., dog vs. cat, hot dog vs. not hot dog, malicious vs. malware, car vs. plane, etc. Supervised learning can include regression or classification where a model is trained to predict X given Y. Unsupervised machine learning also utilizes training data, but without labels, and the unsupervised machine learning model seeks to learn what is behind the data, e.g., clustering, grouping, etc.

FIG. 1 is a diagram of a training process 10 for a machine learning model. Those skilled in the art will recognize FIG. 1 is a high-level generalization of the process 10 for illustration purposes. Training data 12 (again, training datasets, labeled data, or simply datasets) is obtained, such as from a database 14 or other provider, directly from an environment 16, etc. Of note, as described herein, the training data 12 can include both training data and test data. Specifically, one would train the machine learning model on the training data and use a subset of this data, i.e., the test data, to evaluate how well the training was, since the test data is also known, the expectation is a well-trained machine learning model would accurately infer, predict, or classify the test data.

Again, the training data 12 is some historical data related to the environment 16. The environment 16 is what the machine learning model is being trained upon for predictions, inferences, classifications, etc. For example, assuming the machine learning model is used to classify images such as cat vs. dog, then the environment 16 can include all pictures of cats and dogs, and the associated training data 12 is some subset of those images. Of course, we would not want images of car vs. plane in the training data 12 for this user case. In another example, assuming the machine learning model is used for content recommendation, the environment 16 would be one or more content providers, their content, the users, and what users watched or preferred what content. In a further example, assuming the machine learning model is used to classify malware, the environment 16 would be all files including ones that are benign or malicious, and the training data 12 would be a subset of this information.

Of course, those skilled in the art will appreciate these are but a few possible examples, and the environment 16 can be anything and the training data 12 can be anything describing some aspect of the environment 16 with the objective of training the machine learning model to make some prediction, inference, or classification in the future about the environment 16, given some new data and based on the training data 12.

There are various sources of training data, many publicly available, for the databases 14. Publicly available training data 12 can be obtained via Kaggle, Google, UCI Machine Learning Repository, data.gov, National Institute of Health (NIH), and a host of other locations. While these offer large datasets and are reputable sites, there can still be issues with the underlying data in the datasets. The present disclosure focuses on the training data 12 from the databases 14. Namely, answering the questions—(1) how do I know this training data is legitimate? and (2) how do I verify the integrity of the data itself?

The first question (1) can be addressed by the reputation of the database 14 provider. The second question (2) is more complex because the training data 12 is so large, it is impractical for the machine learning model provider to manually review or even spot check the data 12 to ensure it is truly relevant to the application of the machine learning model.

Two example issues related to the second question are unrelated data in the training data 12 and adversarial machine learning. For unrelated data, this can be an innocuous problem where the training data 12 itself is either unrelated to the problem being addressed (e.g., image recognition of cats vs. dogs, where the training data 12 has mainly pictures of cars vs. planes, etc.) or contains a lot of irrelevant data (e.g., again image recognition of cats vs. dogs, but the training data 12 includes all animals). Again, those skilled in the art will recognize these examples for image recognition of cats vs. dogs is merely to illustrate the problem; any practical embodiment is contemplated. In fact, image recognition of cats vs. dogs is not truly a mission-critical use case, relative to autonomous driving, health predictions, etc., but such a use case is easy to visualize to understand the issues. The net effect of the unrelated data will be a trained machine learning model that is inaccurate.

Unlike the unrelated data, adversarial machine learning is not innocuous, but an explicit attack for nefarious purposes. Again, machine learning techniques are generally designed to work on specific problem sets, under the assumption that the training and test data are generated from the same statistical distribution. However, this assumption is often dangerously violated in practical high-stake applications, where users may intentionally supply fabricated data that violates the statistical assumption. A common problem here is data poisoning attacks which includes contamination of the training data 12.

Figure 2:
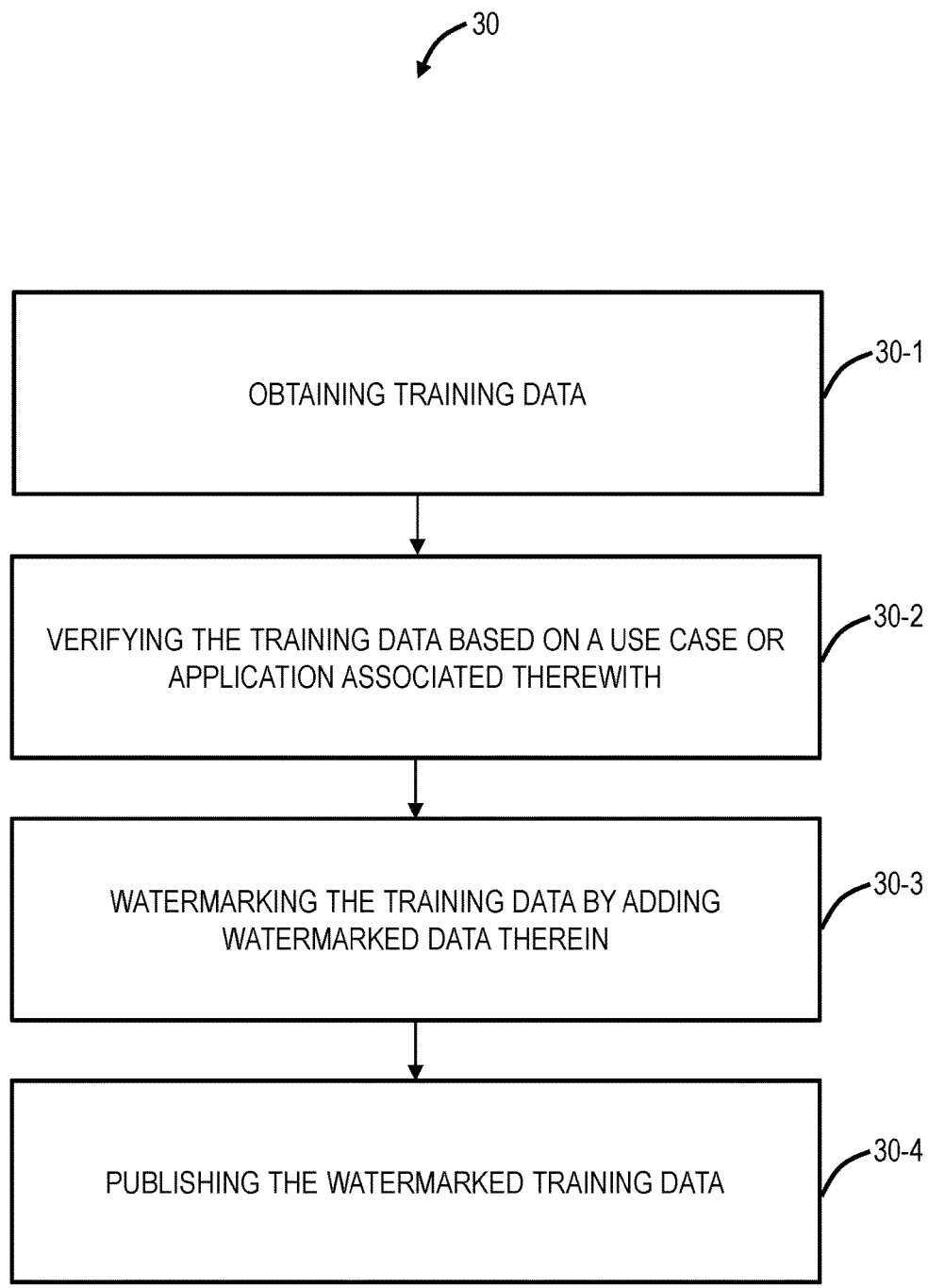
FIG. 2 is a flowchart of a process for watermarking machine learning training data for verification thereof, namely an initial signing and watermark creation stage by a training data provider.
Figure 3:
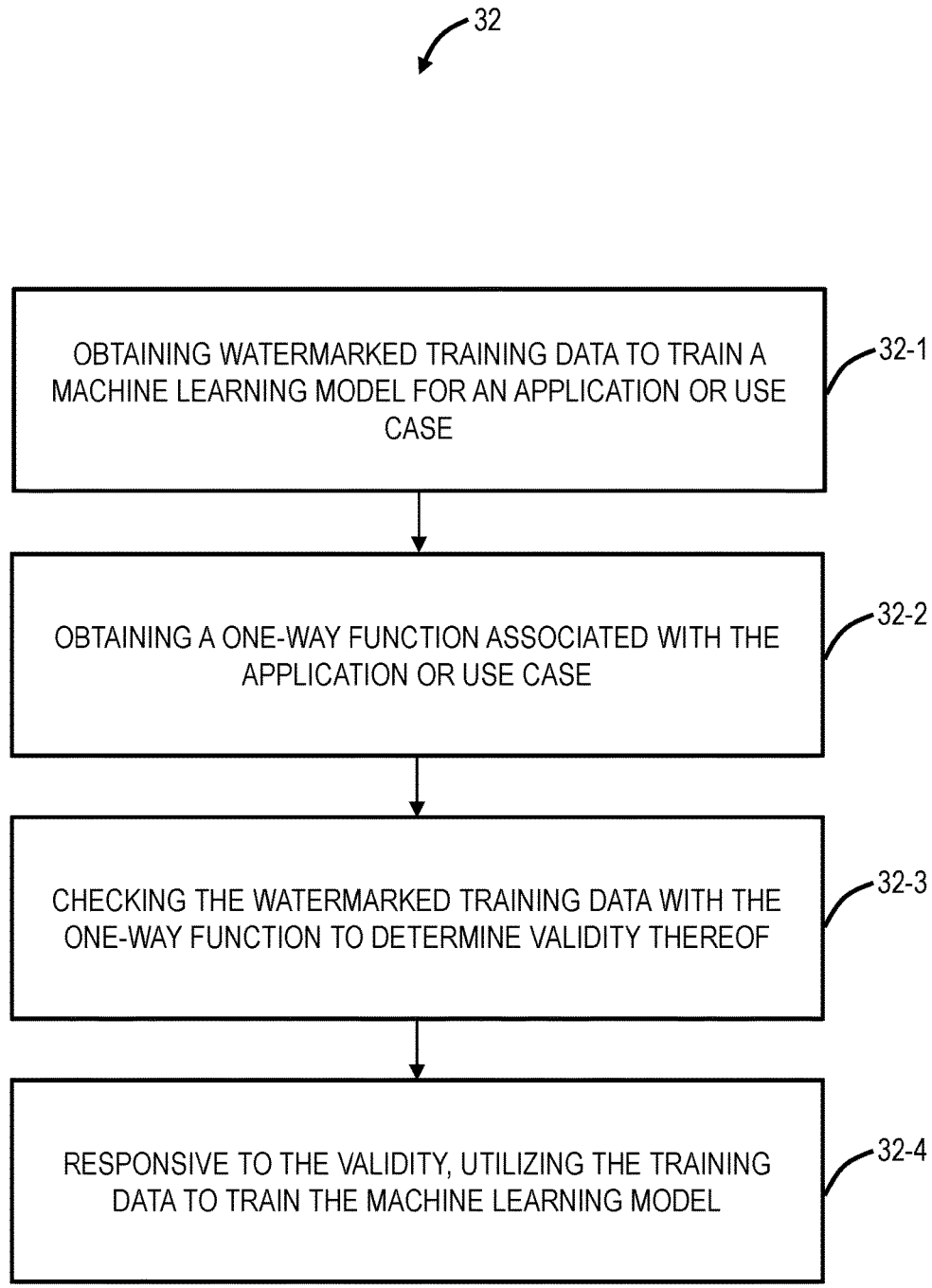
FIG. 3 is a flowchart of a process for watermarking machine learning training data for verification thereof, namely a subsequent verification stage by a machine learning model provider using the watermarked training data.

Process for Watermarking Machine Learning Training Data for Verification Thereof FIGS. 2 and 3 are flowcharts of processes 30, 32 for watermarking machine learning training data for verification thereof. The processes 30, 32 describes both ends of the watermarking, namely the process 30 describes the initial creation stage by the training data 12 provider and the process 32 describes the subsequent verification stage by the machine learning model provider using the watermarked training data 12. The process 30 contemplates implementation as a method having steps, via a processing device or the cloud having computing resources with processors configured to implement the steps, and as a non-transitory computer-readable medium storing instructions that, when executed, cause one or more processors to implement the steps.

As is known in the art, digital watermarking, or simply watermarking as used herein, is a process of adding noise to data with the objective of the noise conveying some information. In a typical example, watermarking is used in digital content (e.g., audio, video, images, etc.) to verify identity or ownership of the digital content. The idea behind watermarking is the data itself is noise-tolerant and the additional noise or watermarked data does not affect the digital content. The watermarked data is hidden and can be extracted to answer some question.

The present disclosure includes adding noise, i.e., watermarked data, into the training data 12 with the intent of conveying the legitimacy of the training data to the machine learning model provider. Specifically, the process 30 describes the adding phase by the training data 12 provider, and the process 32 describes the verifying phase by the machine learning model provider. Additional details regarding examples of the watermarked data and the verifying are further described below.

Process for Watermarking Machine Learning Training Data by a Training Data Provider Referring to FIG. 2, the process 30 includes obtaining training data (step 30-1). Again, the training data 12 is obtained from the environment 16 and relates to some aspect of the environment 16. The training data 12 is historical data and/or simulation data that describes this aspect of the environment 16. Those skilled in the art will recognize there are various approaches to creating the training data; all of which are contemplated herewith. Historical data includes data captured in the past from the environment 16. Simulation data includes data captured based on simulating the environment 16.

The training data 12 is used in supervised, unsupervised, and semi-supervised learning. In supervised learning, the training data must be labeled for the training data 12 to allow the model to learn a mapping from the label to its associated features. In unsupervised learning, labels are not required in the training data 12. Unsupervised machine learning models look for underlying structures in the features of the training data 12 to make generalized groupings or predictions. A semi-supervised training dataset will have a mix of both unlabeled and labeled features, used in semi-supervised learning problems.

The training data 12 can include many different types of data, including structured, unstructured, and semi-structured data. Structured data are data that have clearly defined patterns and data types, where unstructured data does not. Structured data is highly organized and easily searchable, usually residing in relational databases. Examples of structured data include sales transactions, inventory, addresses, dates, stock information, etc. Unstructured data, often living in non-relational databases, are more difficult to pinpoint and are most often categorized as qualitative data. Examples of unstructured data include audio recordings, video, tweets, social media posts, satellite imagery, text files, etc. Depending on the machine learning application, both structured and unstructured data can be used as training data.

The process 30 includes verifying the training data based on a use case or application associated therewith (step 30-2). Here, the training data 12 provider determines that the training data 12 is valid, for the use case or application, and is from a trusted source. Now, the training data 12 provider can be the source as well. Alternatively, the training data 12 provider can obtain the training data 12 from another source.

The other aspect here is the training data 12 contains appropriate data for the use case or application. The training data 12 is considered appropriate or valid if this data (1) is from or about (i.e., simulated data) the environment, (2) is pertinent to the use case or application, and (3) is legitimate. The first point (1) is this data is historical data from the environment 16 and/or simulated data from a simulation of the environment 16. That is, the training data 12 is pertinent. In the image classification example of cats vs. dogs, this means the training data 12 is actually images, not executable files, not structured data about a population, etc., i.e., any digital content that is unrelated to images.

The second point (2) means the data reasonably reflects the use case or application. Again, in the image classification example of cats vs. dogs, the training data 12 includes images of cats and dogs, not animals in general, not images of cars vs. planes, etc. In another example, in a health application looking at a population having certain risk factors for a given disease, the data reasonably covers both the population and the risk factors.

Finally, the third point (3) means the data is legitimate, i.e., not malicious, poisoned, adversarial, etc. Again, in the image classification example of cats vs. dogs, the training data 12 includes images of cats and dogs that are labeled properly, i.e., there are not various images of dogs that are labeled as cats and vice versa. Again, those skilled in the art appreciate the in the image classification example of cats vs. dogs is a simplistic example only for illustration purposes.

This verifying step 30-2 can be done via any approach including manual inspection of some or all of the training data 12, spot checking of some or all of the training data 12, unsupervised learning to cluster the training data 12 along with human inspection, automated analysis via a computer, and the like. For example, again in the image classification example of cats vs. dogs, a human operator would look at the images and labels for verification thereof.

Subsequent to verifying the training data 12, the process 30 includes watermarking the training data by adding watermarked data therein (step 30-3). As described herein, the training data 12 is signed by adding noise, i.e., watermarked data, to the training data 12. The watermarked data includes entries that are purposefully added to the training data 12 so that a machine learning model provider can verify the legitimacy of the training data 12, i.e., to convey the results of the verifying step 30-2, without requiring the machine learning model provider to perform the verifying step 30-2.

Details of the added noise/watermarked data are described below. Of note, the training data 12 is noise-tolerant to some extent, meaning having some bad or meaningless data entries is tolerable and has little effect on the trained machine learning model. Our approach is to include a small amount of noise for the watermarking, such that the added noise is small and the overall signal-to-noise ratio (SNR) of the training data 12 is large and such that a machine learning model provider can use the small amount of noise to determine the legitimacy, veracity, and validity of the underlying data.

In addition to watermarking the training data, there can be another step of signing the watermarked training data 12. This signing step can be performed in addition to the watermarking step 30-3. The signing step can include verifying the training data 12 provider's identity, obtaining a private key, and utilizing the private key to sign the watermarked training data 12 with a digital certificate, such as using a singing engine. The verifying the training data 12 provider's identity can be via a remote identity validation process, also referred to as identity proofing utilizing government identification, biometrics, facial recognition, or other mechanism of identity validation. This, in combination with the watermarked data, will prove two things—(1) the training data 12 has been validated by an individual (it is also possible this person's identity has also been validated via remote identity validation), and (2) The valid training data 12 provider uses their client certificate to sign the data.

Finally, the process 30 includes publishing the watermarked training data (step 30-4). The publishing can take any form and a simple example would be to upload to the database 14, post on the Internet, etc. The publishing can include a description of the use case or application, i.e., training data 12 for image recognition between cats and dogs, etc., as well as a one-way function that can be used to verify the watermarking. Again, more details are presented below regarding the one-way function to verify the watermarking.

Signing and Watermarking

Signing and including the watermarked (noise/fake) data can be two separate steps. In a first example scenario, we want to know that the data is coming from the right source, and we want to know that with a very high probability. In this case, we are not afraid of showing that the data has been signed cryptographically; this by itself could be an indication that we do take security seriously but almost anyone could acquire a certificate and sign their data set. For this reason, the present disclosure contemplates the watermarked data. That is, signing the training data 12 by itself may convey some legitimacy, but as noted above, anyone can get a certificate and sign a data set. In the present disclosure, call it scenario two, we can also require signing of the data in combination with the noise embedded therein. The key here is the noise cannot be faked due to the agreed upon one-way function. If this noise is not presented, then we can conclude that the sender has provided malicious or non-verified data.

Process for Verifying Watermark Machine Learning Training Data by a Machine Learning Model Provider Referring to FIG. 3, the process 32 includes obtaining watermarked training data to train a machine learning model for an application or use case (step 32-1). Again, the watermarked training data 12 can be created based on the process 30, and it can be obtained directly from the training data 12 provider, from a database 14, from the Internet, etc. The key here is we have some training data 12 that can be used for training a machine learning model, but the question is (1) has this training data 12 been validated, and, optionally, (2) is the training data 12 provider valid? The watermarked data is used to answer the first question (1), and, optionally, a digital certificate is used to answer the second question (2).

The process 32 includes obtaining a one-way function associated with the application (step 32-2). The one-way function is known ahead of time between the training data 12 provider and the machine learning model provider. For example, the one-way function can be published with the training data 12, shared ahead of time, predefined, etc. Any such embodiment is contemplated, as long as there is agreement in advance. The key here, as described below, is the one-way function is generally only computable in one direction, so no need to hide the one-way function. That is, the one-way function can be used to verify the presence of the watermarked data, but not used to insert new watermarked data.

Next, the process 32 includes checking the watermarked training data with the one-way function to determine validity thereof (step 32-3). Here, the checking step 32-3 includes applying the one-way function to the watermarked training data 12, and an output includes identification of some or all of the watermarked data in the watermarked training data 12. Note, an illustrative example of a one-way function and the checking step 32-3 is presented below. The key here is taking the watermarked training data 12 and applying the one-way function yields data indicative of which entries are the watermarked data.

That is, once the training data 12 provide adds the watermarked (noise/fake) data, offers it to the machine learning model provider (receiver), the machine learning model provider, utilizing the previously agreed upon one-way function, applies the one-way function to the watermarked training data with the objective of producing meaningful results in the watermarked training data. As described herein, meaningful results means there is identification of specific entries in the watermarked training data, i.e., meaningful here is defined as looking for fake elements. The ability to create or identify entries using the one-way function validates that this data has both come from the right source and has verified data therein.

In an embodiment, the process 32 can further include removing the watermarked data after identification by the one-way function. Again, the watermarked data is fake or noise, purposefully added to convey the validity of the watermarked training data 12. Since the one-way function identifies the watermarked data, it is possible to now remove this watermarked data from the training data 12. This solves any issue with signal-to-noise by adding the watermarked data.

In a further embodiment, the process 32 can further include checking a signature of the watermarked training data 12. Here, the training data 12 provider has signed the watermarked training data 12, and the machine learning model provider can check this signature. Again, this does not necessarily mean the training data 12 is valid, but it does add additional verification, in addition to the presence and identification of the watermarked data.

The process 32 includes, responsive to the validity, utilizing the training data to train the machine learning model (step 32-4). Again, this can be as is known in the art, but with the knowledge the training data 12 has been verified for the application or use case. The utilizing step 32-4 can be performed subsequent to removing the watermarked data after identification by the one-way function. Alternatively, the utilizing step 32-4 can be performed with the watermarked (noise/fake) data remaining in the training data 12. Of note, the training data 12 is noise-tolerant to some extent and this added, fake, noise data will have minimal impact on the training process of the machine learning model Watermarking Example In a first example, assume the data in the training data 12 is represented by colors, such as:

Blue (B)

Yellow (Y)

Green (G)

Red (R)

All of this data, B, Y, G, R, is considered valid training data. Now, to add watermarked data, let's choose Purple (P) which is fake or noise data, which looks like valid training data, and which can be identified via a one-way function. For example, the one-way function in this example could combine data from two colors, say Green (G) and Red (R) to yield Purple (P), i.e., as is known in colors, combining Green (G) and Red (R) yields Purple (P). The key here is the Purple (P) data looks like valid training data and is only identifiable via the one-way function of combining Green (G) and Red (R).

In a second example, assume the data in the training data 12 is structured data of people, e.g.:

| Name | Gender | Age | Race |
|------|--------|-----|------|
| JS | M | 23 | W |
| KB | M | 34 | B |

Now, let's create a fake or watermarked entry, as follows:

| Name | Gender | Age | Race |
|------|--------|-----|------|
| ST   | M      | 26  | W    |

From inspection of these three entries, it is difficult to impossible to identify the fake entry, namely ST. This entry is created based on the existing training data. For example, the name can be some related combination. The gender is selected as M as the other two entries are M. The age is an average of the other two entries. Finally, the race can be either W or B since the valid training data is split equally. The one-way function in this example follows from the steps used to create the fake entry. That is, the name generation algorithm, the gender selection algorithm, the average of the ages, and the selection of the race.

One-Way Function

The watermarked data is added to the training data 12 in a manner that hides its location therein, to prevent tampering, etc. The machine learning model provider can implement a one-way function on the training data 12 with the watermarked data to check the signing thereof. The advantage of the one-way function is that it only works to check the signing and does not enable an adversary to manipulate the training data 12 to forge a signature thereon.

The one-way function basically means that you are able to calculate (easily), e.g., if I give you the number 15, can you tell me what numbers were multiple together which resulted in 15? It could 3×5, 1×15, 7.5×2, and on and on, but if I give you 3 and 5 and ask you to multiple them together, you'll be able to easily get to 15 as a product. This is similar to our approach, the numbers we provide are elements of the noise that we add to the original dataset and the operation (in the example of 3 and 5 that's multiplication) would be the process of identifying the fake entries. However, just simply looking at the watermarked (fake) entries, you cannot identifying how we have produced those entries hence the name one-way function.

The one-way function is a function that has been agreed between sender (training data 12 provider) and receiver (machine learning model provider). For illustration, let's consider the following example.

Person S is the Sender/Provider of the data and Person R is the Receiver/Data trainer. Sender S sends the data set S:[1, 2, 3, 5, 8, 13, 14, 10, 8] and receiver R gets the same data set. Based on a previous agreement (read agreement as the one-way function), every time a data set comes from a valid sender S the receiver R should look for a specific pattern using the one-way function that they have agreed on.

This function for the sake of this example could be:
(1) If data length is an odd number (in the dataset S, this is true since you have 9 entries),
(2) Take the first 6 entries, add the 1st and 6th entry (1+13=14), add the 2nd and 5th entry (2+8=10), add the 3rd and 4th entry (3+5=8), yielding three entries 14, 10, 8,
(3) Remove the three entries 14, 10, and 8,
(4) Remaining data will be S':[1, 2, 3, 5, 8, 13], this is now considered the real data without noise but also it proves that we the sender S has deliberately injected data in the data set to show this data has come from the right sender and has been validated.

We do know that the process has worked where via (1) we see the signed data, and (2) we have identified the existing noise using our agreed function.

Those skilled in the art will recognize the above example of the one-way function is relatively simple for illustration purposes and actual one-way functions can be more complex. Again, a key aspect of the one-way function is it is known by both parties in advance, and it is computationally easy in one direction only, i.e., it is used to verify the watermarked data, but cannot be used to create new watermarked data.

Processing System

Figure 4:
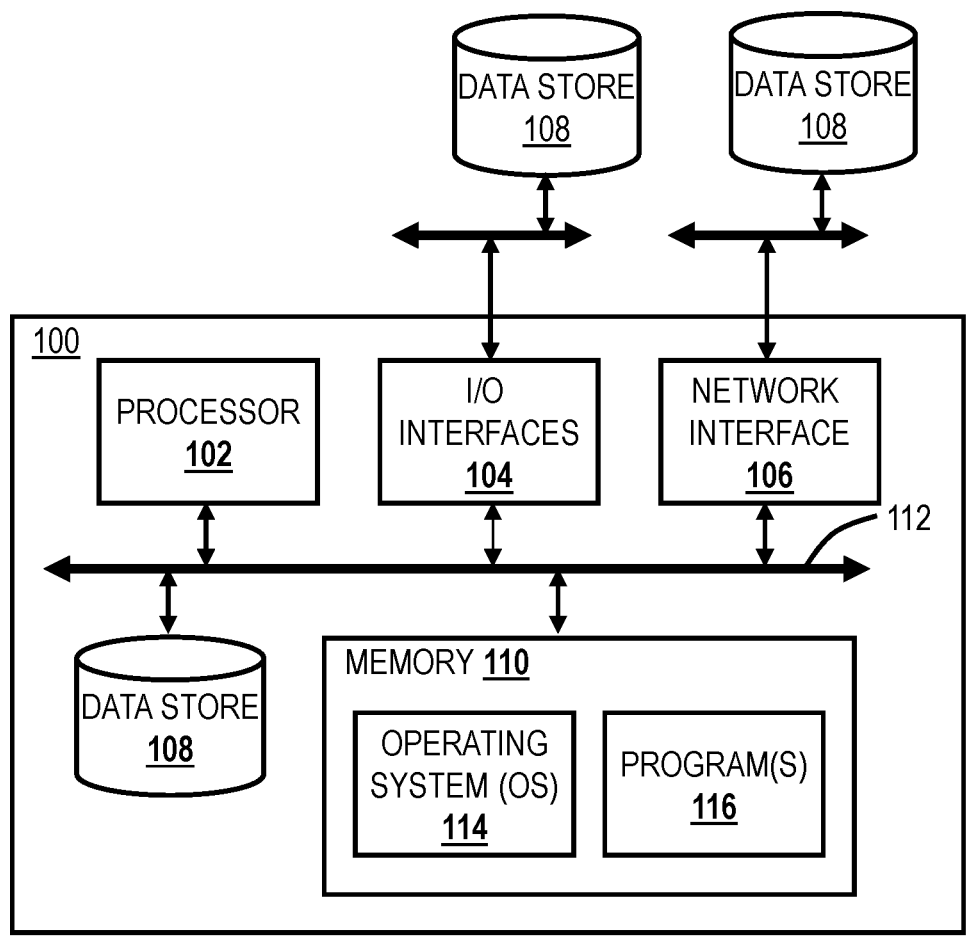
FIG. 4 is a block diagram of a processing system.

FIG. 4 is a block diagram of a processing system 100, which may implement any of the devices or processes described herein. The processing system 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 4 depicts the processing system 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a Central Processing Unit (CPU), an auxiliary processor among several processors associated with the processing system 100, a semiconductor-based microprocessor (in the form of a microchip or chipset), or generally any device for executing software instructions. When the processing system 100 is in operation, the processor 102 is configured to execute software stored within the memory 110, to communicate data to and from the memory 110, and to generally control operations of the processing system 100 pursuant to the software instructions. The I/O interfaces 104 may be used to receive user input from and/or for providing system output to one or more devices or components.

The network interface 106 may be used to enable the processing system 100 to communicate on a network, such as the Internet. The network interface 106 may include, for example, an Ethernet card or adapter or a Wireless Local Area Network (WLAN) card or adapter. The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 108 may incorporate electronic, magnetic, optical, and/or other types of storage media. In one example, the data store 208 may be located internal to the processing system 100, such as, for example, an internal hard drive connected to the local interface 112 in the processing system 100. Additionally, in another embodiment, the data store 108 may be located external to the processing system 100 such as, for example, an external hard drive connected to the I/O interfaces 204 (e.g., SCSI or USB connection). In a further embodiment, the data store 208 may be connected to the processing system 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable Operating System (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Of note, the general architecture of the processing system 100 can define any device described herein. However, the processing system 100 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method of training a machine learning model, the method comprising steps of:
   obtaining training data to train the machine learning model for an application or use case, to any of make predictions, inferences, and classifications related to the application or use case;
   obtaining a one-way function associated with the application or use case;
   checking the training data with the one-way function to determine validity thereof; and
   responsive to the validity, utilizing the training data to train the machine learning model.

2. The method of claim 1, wherein the steps further include:
   checking a certificate used to sign the training data; and
   performing the utilizing responsive to the validity and verification of the certificate.

3. The method of claim 1, wherein the checking the training data with the one-way function includes:
    obtaining a plurality of entries in the training data from the one-way function, wherein the plurality of entries are watermarked data which is noise added to the training data.

4. The method of claim 3, wherein the steps further include:
    prior to the utilizing, removing the plurality of entries that are watermarked data.

5. The method of claim 3, wherein the steps further include:
    performing the utilizing with the plurality of entries that are watermarked data included therein.

6. The method of claim 3, wherein the validity is based on a presence of the plurality of entries are watermarked data in the training data.

7. The method of claim 1, wherein the one-way function is configured to identify entries from the training data, but to not enable creation of the entries.

8. A non-transitory computer-readable medium comprising instructions that, when executed, cause one or more processors to perform steps of:
    obtaining training data to train the machine learning model for an application or use case, to any of make predictions, inferences, and classifications related to the application or use case;
    obtaining a one-way function associated with the application or use case;
    checking the training data with the one-way function to determine validity thereof; and
    responsive to the validity, utilizing the training data to train the machine learning model.

9. The non-transitory computer-readable medium of claim 8, wherein the steps further include:
    checking a certificate used to sign the training data; and
    performing the utilizing responsive to the validity and verification of the certificate.

10. The non-transitory computer-readable medium of claim 8, wherein the checking the training data with the one-way function includes:
    obtaining a plurality of entries in the training data from the one-way function, wherein the plurality of entries are watermarked data which is noise added to the training data.

11. The non-transitory computer-readable medium of claim 10, wherein the steps further include:
    prior to the utilizing, removing the plurality of entries that are watermarked data.

12. The non-transitory computer-readable medium of claim 10, wherein the steps further include:
    performing the utilizing with the plurality of entries that are watermarked data included therein.

13. The non-transitory computer-readable medium of claim 10, wherein the validity is based on a presence of the plurality of entries are watermarked data in the training data.

14. The non-transitory computer-readable medium of claim 8, wherein the one-way function is configured to identify entries from the training data, but to not enable creation of the entries.

15. A method of watermarking a machine learning model, the method comprising steps of:
    obtaining training data;
    responsive to verifying the training data based on a use case or application associated therewith, watermarking the training data by adding watermarked data therein; and
    publishing the watermarked training data.

16. The method of claim 13, wherein the steps further include:
    signing the watermarked training data with one or more certificates.

17. The method of claim 14, wherein the one or more certificates are for a training data provider and an entity associated with the verifying.

18. The method of claim 13, wherein the wherein the adding watermarked data therein is based on a one-way function, known in advance.

19. The method of claim 18, wherein the one-way function is configured to identify entries from the training data, but to not enable creation of the entries.

20. The method of claim 13, wherein the verifying the training data determines the training data is legitimate for the use case or application associated therewith.

* * * * *